Sept. 20, 1971        JIRO SASAKI        3,606,016
FILTERING METHOD AND APPARATUS THEREFOR
Filed Dec. 18, 1969        3 Sheets-Sheet 1
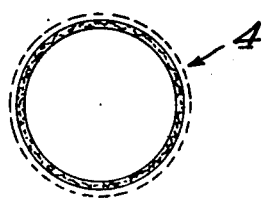
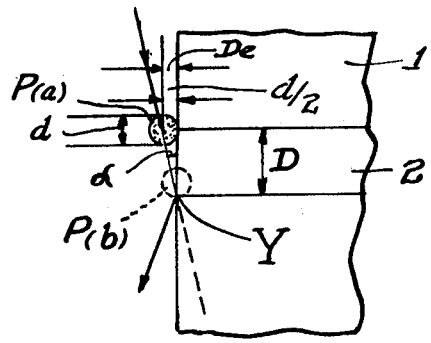
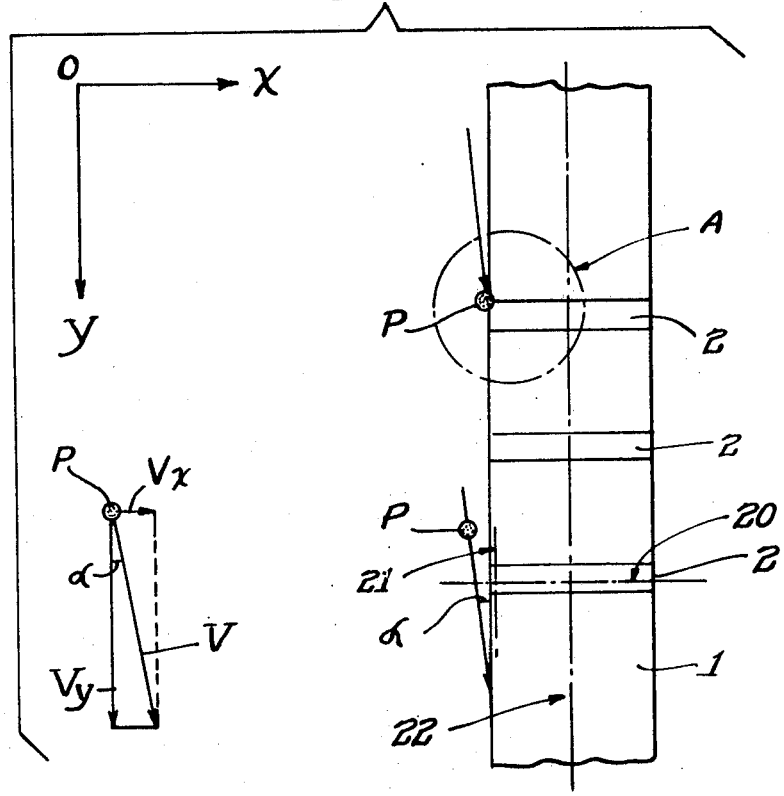
Inventor
Jiro Sasaki
By: Olson, Trexler, Wolters & Bushnell attys

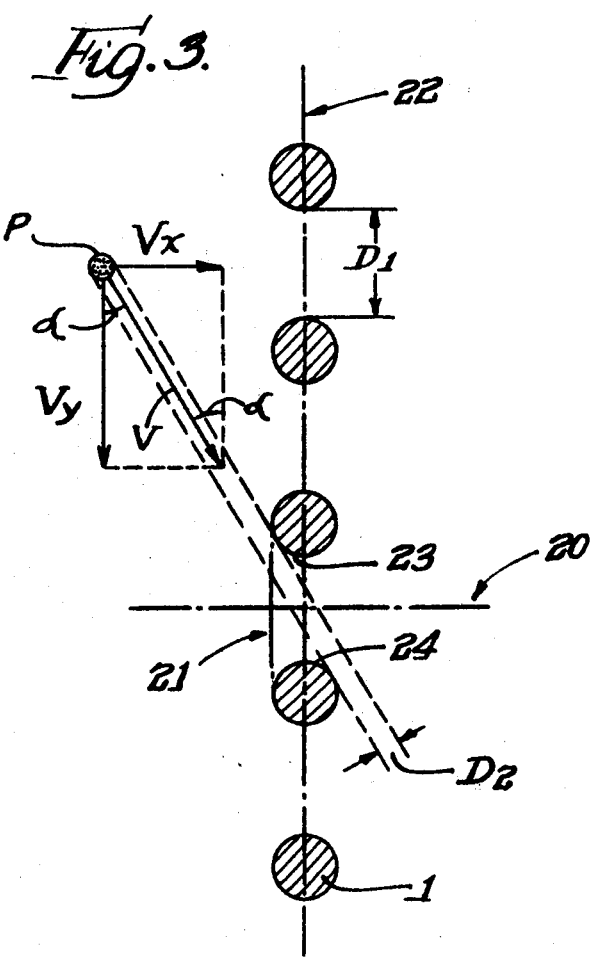

3,606,016
FILTERING METHOD AND APPARATUS THEREFOR
Jiro Sasaki, 4067-2 Nimyo-cho, Nara, Japan
Filed Dec. 18, 1969, Ser. No. 886,318
Claims priority, application Japan, May 21, 1969,
44/39,810
Int. Cl. B01d 37/04
U.S. Cl. 210—65                      4 Claims

ABSTRACT OF THE DISCLOSURE

A filtering method in which the filtration of impurity particles from a liquid is performed by causing the liquid and impurity particles contained therein to flow along a path having a preselected angle with respect to the longitudinal axis of a filter medium whereby impurity particles having grain sizes larger than the effective diameter of the pores of the filter medium are not able to pass through the pores, the intended degree of purification of the liquid thereby being achieved.

---

This invention relates to a novel filtering method, and more particularly to a filtering method which is based on a novel principle and which permits of the filtration of impurity particles from a liquid in cases where separation of the impurities from the liquid by conventional filtering methods has generally proven inadequate.

For conventional filtering methods to be effective, solvated impurity particles having small grain sizes must display the property in a fluid of being able to adhere to one another and to gather on the surface of a filter medium whereby to permit the liquid to pass through the layer of gathered impurity particles and through the filter medium. However, not all impurity particles display these characteristics. Thus, for example, impurity particles suspended in a fluid display little motion. Therefore, the tendency of the particles to adhere to one another is reduced so that no significant accumulation thereof occurs on the surface of a filter medium. In such cases, it is impossible to accomplish a precise separation of impurity particles having small grain sizes from the liquid by employment of conventional filtering methods.

Accordingly, an important object of the present invention is to provide a novel filtering method which permits of a precise separation of solvated impurity particles having small grain sizes from the liquid to be purified, the separation otherwise being very difficult where conventional filtering methods are to be employed.

Another object of the present invention is to provide a filtering method which is applied to the filtration of all kinds of liquids to be purified and which permits of precise separation of impurity particles in the liquids.

Still another object of the present invention is to provide a filtering method which can be performed continuously with a filtering apparatus having a simple construction.

According to the present invention, these objects are accomplished by causing the liquid to be purified to flow along a path having a definite angle with respect to the longitudinal axis of the filter medium, the angle of flow being preselected by considering the grain sizes of impurity particles, the diameter of the pores of the filter medium and the intended degree of purification. The angle of flow of the liquid to be purified is controlled by regulating the ratio of the flow rate in a direction normal to the longitudinal axis of the filter medium and the flow rate in a direction parallel with the longitudinal axis of the filter medium. The liquid to be purified is caused to flow at a preselected rate in a direction normal to the longitudinal axis of the filter medium by extracting purified liquid from the opposite side thereof. Concurrently, the liquid is caused to flow at a preselected rate in a direction parallel with the longitudinal axis of the filter medium by pumping the liquid therethrough. The liquid and solvated impurity particles contained therein are thus caused to flow along a resultant path having an angle with respect to the longitudinal axis of the filter medium whereby particles having grain sizes larger than the effective diameter (defined below) of the pores of the filter medium are not able to pass through the pores.

The invention will become more readily apparent as the specification is considered in conjunction with the accompanying drawings in which:

FIG. 1 is a schematic view illustrating the principle of the filtering method according to the present invention;

FIG. 2 is an enlarged schematic view showing the area of FIG. 1 which is enclosed in circle A;

FIG. 3 is a schematic view illustrating in another way the principle of the filtering method according to the present invention;

FIG. 5 is an enlarged cross-sectional view of a filtering cylinder of the filter medium in the device shown in FIG. 4.

Figure 4:
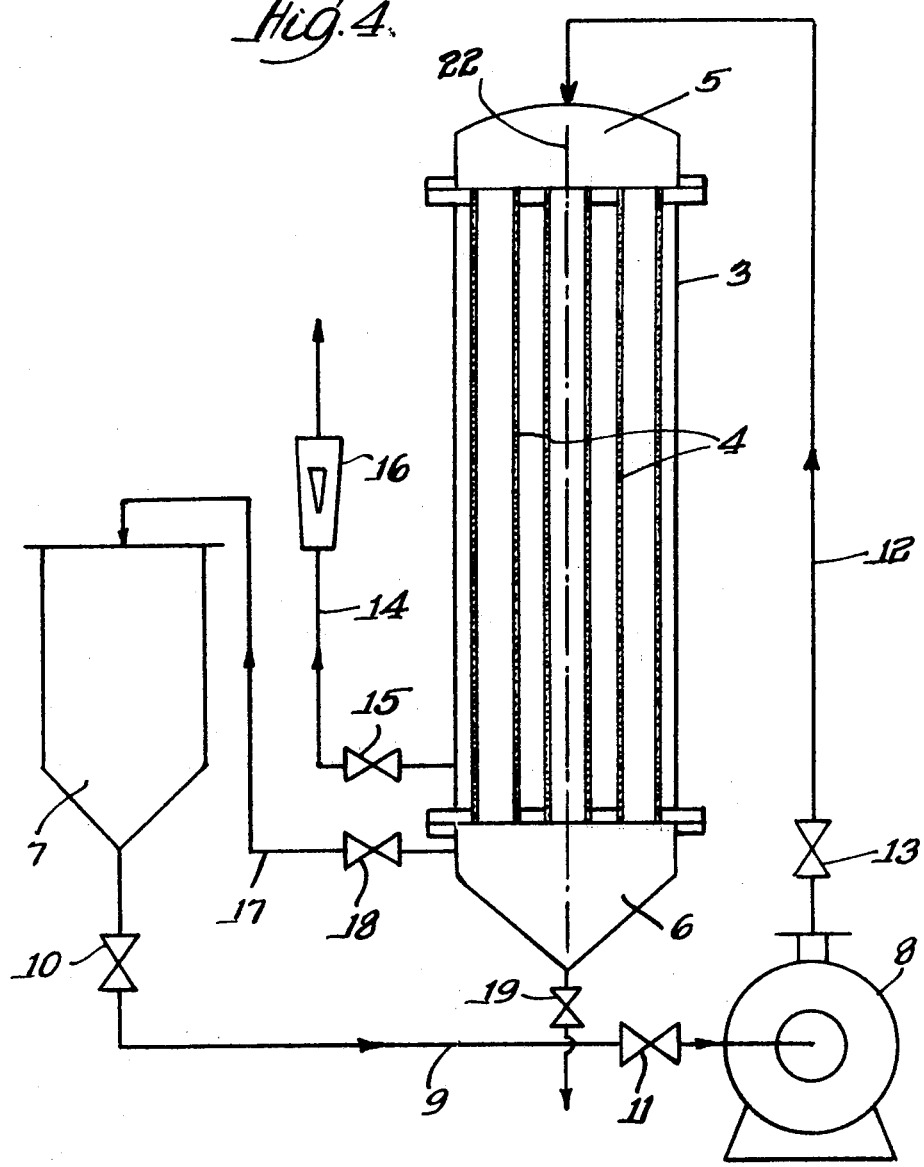
FIG. 4 is a flow diagram of a filtering apparatus for performing the filtering method according to the present invention.

Referring now to the drawings, specifically to FIGS. 1 and 2, the principle of the filtering method according to the present invention is indicated. A pore 2, defining longitudinal and transverse axes 20 and 21 respectively and shown cavitied through the filter medium 1 defining a longitudinal axis 22, has a circular cross-section with inner diameter D; and each impurity particle P in the liquid to be purified is in the form of a globe having diameter $d$. The X-coordinate is taken along a direction normal to the longitudinal axis 22 of the filter medium 1, and the Y-coordinate is taken along a direction parallel with the longitudinal axis 22 of the filter medium, as illustrated in FIG. 1. Each impurity particle P has a velocity in a direction normal to the longitudinal axis 22 of the filter medium 1 (and indicated in FIG. 1 by velocity vector $V_x$), the velocity in this direction being determined by the extraction rate of purified liquid from the opposite side of the filter medium 1; and each particle P has a velocity in a direction parallel with the longitudinal axis 22 of the filter medium 1 (and indicated in FIG. 1 by velocity vector $V_y$), the velocity in this direction being determined by the flow rate, along the Y-coordinate, caused by pumping the liquid through the filter medium. The particle P, therefore, reaches the surface of the filter medium 1 at an angle $\alpha$ with respect to the longitudinal axis 22 and has a velocity and a direction of flow represented by resultant vector V as is shown in FIG. 1. The angle $\alpha$ is determined by the following Formula 1:

$$\alpha = \tan^{-1} \frac{V_x}{V_y} \tag{1}$$

As will be appreciated, the angle $\alpha$ may be adjusted so that the center of the particle P($a$) may flow along a path which does not permit a portion of the particle P($a$) above its center to enter the inlet channel of the pore 2. If the lowest inlet portion Y of the pore 2 is along the flow path of the center of the particle P($a$) (the particle along this flow path indicated in broken outline in FIG. 2 as P($b$)), then the angle $a$ is $$\tan^{-1} \frac{d/2}{D} \text{ or } \frac{d}{2D}$$

Therefore, the condition that the particle P($a$) never enters the pore 2 is given by the following Formula 2:

$$\alpha < \tan^{-1} \frac{d}{2D} \quad (2)$$

The effective diameter $D_e$ of the pore 2 (defined as a line which is normal to the transverse axis 21 of the pore 2 and which is the measure of the greatest distance from the mouth or inlet channel of the pore 2 to a particle P having its center travel along a resultant flow path which has an angle $\alpha$ with respect to the transverse axis 21, the line subtending the angle $\alpha$ and defining the diameter of the corridor through which the particle P may pass to be received by the pore 2) is seen to be a function of the angle $\alpha$. Thus, if the angle $\alpha$ of the flow path of the center of the particle P is adjusted so that the effective diameter $D_e$ of the pore 2 is less than one-half the diameter of the particle P, then the particle P will not be permitted ingress through the pore 2. From Formulas 1 and 2, it can be seen that for none of the impurity particles P to pass through the pores 2, the condition, expressed by the following Formula 3, must occur:

$$\frac{d}{2D} > \frac{V_x}{V_y} \quad (3)$$

The filtration according to the present invention is performed under the condition given by the Formula 3. That is, the liquid to be purified and the solvated impurity particles contained therein are made to flow at a preselected angle with respect to the longitudinal axis 22 of the filter medium, the angle being determined according to Formulas 2 and 3. Of course, there are impurity particles having various grain sizes, and all of the pores of the filter medium do not have the same inner diameters. But, when the inner diameter of the largest pore in the filter medium and the diameter of the smallest impurity particle intended to be removed are used for preselecting the angle of flow, the intended degree of purification is always achieved.

Turning to a consideration of FIG. 3, each of the pores 2, defining longitudinal and transverse axes 20 and 21 respectively and shown cavited through the filter medium 1 defining a longitudinal axis 22, has a circular cross-section with an inner diameter of $D_1$. An impurity particle P in the liquid to be purified flows with a velocity and in a direction represented by resultant velocity vector V, the direction being such that the particle P reaches the surface of the filter medium 1 at an angle $\alpha$ with respect to the longitudinal axis 22, the angle $\alpha$ being determined by the ratio of velocity vectors $V_x$ and $V_y$, as was the case discussed with respect to FIGS. 1 and 2. As indicated in FIG. 3, the size of the largest particle which can pass through the pore 2 is seen to be defined by two lines drawn tangent to the particle, each of which lies parallel to the direction of flow and each of which, when extended, tangentially touches one surface respectively of the opposing walls 23 and 24 surrounding the pore 2. Thus, the diameter $D_2$ of the largest particle which can pass through the pore 2 is much smaller than the inner diameter $D_1$ of the pore 2. In other words, the inner diameter of pore 2 may be viewed as being substantially reduced from actual diameter $D_1$ to effective diameter $D_2$. As will be appreciated, the smaller the angle $\alpha$, the smaller the effective diameter $D_2$. Thus, all of the impurity particles larger than the largest impurity particle which can pass through the pore 2 at a given value of $\alpha$ can be removed; and the size of the impurity particles sought to be removed can be predetermined by adjusting the angle $\alpha$ accordingly.

Referring to FIGS. 4 and 5, the filtering apparatus includes a filtering tank 3 containing a filter medium in the form of a plurality of vertical cylinders 4. The liquid to be purified is fed into an upper chamber 5 of the tank 3 and is caused to flow through the clearances between the cylinders 4 and into a lower chamber 6 of the tank 3. A conduit 9 having valves 10 and 11 connects a vessel 7 which stores the liquid to be purified and the inlet portion of a pump 8 which feeds the liquid through a conduit 12 having a valve 13 and into the upper chamber 5 of the filtering tank 3. The inside of each cylinder 4 opens through an outlet conduit 14 having a valve 15 and a flowmeter 16. Purified liquid is extracted from the inside of each cylinder 4 and is passed through the conduit 14 with the aid of a suction pump (not shown). Unfiltered liquid is recirculated from the lower chamber 6, through a conduit 17 having a valve 18 and into the vessel 7. The impurities, which have been filtered, form a precipitate on the bottom of the lower chamber 6 and are removed periodically by opening the valve 19. The vessel 7 may be supplied either continuously or intermittently with the liquid to be filtered. Furthermore, the liquid in the lower chamber 6 may be recirculated into the upper chamber 5 with the aid of a pump.

In performing the filtration by using the filtering apparatus shown in FIGS. 4 and 5 according to the principles of the present invention, the "parallel" flow rate of the unfiltered liquid passing from the upper chamber 5, through the clearances between the cylinders 4 and into the lower chamber 6 is controlled by regulating the rotation speed of the pump 8 and/or by regulating at least one of the valves 10, 11 and 13. The "normal" flow rate of the unfiltered liquid passing through the pores of the cylinders 4 of the filter medium is a function of the pressure difference between the outside and the inside of the cylinders 4 and is controlled by regulating the rotation speed of a suction pump (not shown) connecting the cylinders 4 and the outlet conduit 14 and/or by regulating the valve 15. Thus, the ratio of the velocity component normal to the longitudinal axis 22 of the filter medium (cylinders) and the velocity component parallel with the longitudinal axis 22 of the filter medium (cylinders) may have a value preselected according to the Formula 3; and the liquid to be purified is, therefore, caused to flow along a path having an angle with respect to the longitudinal axis of the filter medium. Impurity particles having grain sizes larger than the smallest particle sought to be removed, thus, never enter the pores of the cylinders 4. Therefore, it can be seen that one may regulate, by application of the principles of the instant invention, the degree of purification of the liquid to be filtered.

The filter medium used for performing the filtration according to the present invention may be comprised of stainless steel wire of various gauzes, of synthetic fibers, of foamed resin, of a sintered or perforated metal alloy or of a perforated porcelain, the latter two of which may be formed, for example, into a cylinder having a wall of small thickness.

The thickness of the wall of the filter medium may be between 50 and 60 microns. The inner diameter of the pores cavited through the wall of the filter medium may be between 35 and 150 microns. The flow rate of the liquid to be purified may be between 5 and 20 cubic meters/min. in the direction normal to the longitudinal axis of the filter medium and may be between three and ten times that value in the direction parallel with the longitudinal axis of the filter medium.

The filtering method according to the present invention may be applied for purification of all kinds of liquids including fresh water, sea water, oil and petroleum. The method is preferably used for separating detergents, rust preventing agents and the like from water, for purifying drinking water, for removing planktons from sea water, for purifying petroleum, for recovering pulp from water in pulp-producing plants, for purifying lubricating or cooling oil and for other similar purposes.

One of the most important advantages of the present invention resides in its providing a precise method for separation of impurity particles of various grain sizes from a liquid, whereas such separation by conventional filtering methods often proves inadequate. Additionally, the filtering operation is facile, because the ratio of the flow rate normal to the longitudinal axis of the filter medium and the flow rate parallel with the longitudinal axis of the filter medium can easily be controlled by regulating the rotation speeds of the pumps in the apparatus and/or by regulating the valves in the conduit lines. Furthermore, the instant invention permits of the use of a filtering apparatus having a simple construction, thereby alleviating the necessity for considering, with any singularity, the selection of a material for the filter medium. Thus, the present invention provides a very useful and economical filtering method which can be utilized for many industrial purposes.

Having now described the invention and the manner in which it can be utilized, it will be apparent to those skilled in the art that a number of variations, applications, modifications and extensions of the basic principles involved may be made without departing from its scope. The drawings and the foregoing descriptions are intended in a generic and descriptive sense only and not for the purposes of limitation, the scope of the invention being delineated in the following claims.

What is claimed is:

1. A filtering method for purifying a slurry of a fluid having impurity particles of various grain sizes contained therein, said method comprising the steps of: providing a permeable filter medium which has pores therein; initiating the passage of said slurry relative to said filter medium; preselecting and regulating the respective flow rates of said slurry in a direction substantially normal to the propagated surface of said filter medium and in a direction substantially parallel with the propagated surface of said medium, whereby to impart to said slurry a resultant flow along a path having an angle oblique with respect to said propagated surface, said resultant flow permitting through said pores selective penetration of said fluid and of impurity particles having grain sizes smaller than a predetermined size while precluding the penetration of impurity particles having grain sizes larger than said predetermined size.

2. A filtering method according to claim 1 wherein said step of preselecting and regulating the respective flow rates of the slurry normal to and parallel with the propagated surface of said filter medium includes the step of controlling the flow of said slurry such that the ratio of the flow rate normal to said propagated surface ($V_x$) and the flow rate parallel with said propagated surface ($V_y$) is less than the ratio of one-half the diameter of the smallest particle to be filtered ($d/2$) and the inner diameter of the largest pore in said filter medium (D), whereby the angle of said resultant flow ($\alpha$) is determined by an equation, $$\alpha = \frac{V_x}{V_y} < \frac{d}{2D}$$

3. A filtering method according to claim 1 wherein the step of regulating said flow rate normal to the propagated surface of said filter medium is performed by extracting purified liquid through said filter medium.

4. Filtering apparatus for purifying a slurry of fluid having impurity particles of various grain sizes contained therein, said filtering apparatus comprising: a permeable filter medium having pores therein; means for initiating the passage of said slurry relative to said filter medium; and means for preselecting and regulating the respective flow rates of said slurry in a direction substantially normal to the propagated surface of said filter medium and in a direction substantially parallel with the propagated surface of said filter medium, whereby to impart to said slurry a resultant flow along a path having an angle oblique with respect to said propagated surface, said resultant flow permitting through said pores selective penetration of said fluid and of impurity particles having grain sizes smaller than a predetermined size while precluding the penetration of impurity particles having grain sizes larger than said predetermined size.

References Cited

UNITED STATES PATENTS

| | | | |
|---|---|---|---|
| 624,777 | 5/1899 | Fausek | 210—65 |
| 2,775,550 | 12/1956 | Harlow | 210—65 |

JAMES L. DECESARE, Primary Examiner

U.S. Cl. X.R.

210—323